United States Patent [19]

Fattore et al.

[11] 3,764,635
[45] Oct. 9, 1973

[54] PROCESS FOR DISPROPORTIONATING THE OLEFINS

[75] Inventors: Vittorio Fattore, San Donato Milanese; Marcello Mazzei, Milano; Bruno Notari, Milanese, all of Italy

[73] Assignee: Snam Progetti, S.p.A., Milanese, Italy

[22] Filed: Apr. 14, 1971

[21] Appl. No.: 134,094

[30] Foreign Application Priority Data
Apr. 14, 1970 Italy .............................. 23269 A/70

[52] U.S. Cl. ...... 260/683 D, 260/668 R, 260/680 R
[51] Int. Cl. .............................................. C07c 3/62
[58] Field of Search ................... 260/683 D, 668 R, 260/680

[56] References Cited
UNITED STATES PATENTS

| | | | |
|---|---|---|---|
| 3,488,402 | 1/1970 | Michaels et al. | 260/680 |
| 2,991,322 | 7/1961 | Armstrong et al. | 260/680 |
| 3,370,103 | 2/1968 | Callahan et al. | 260/680 |
| 3,511,890 | 5/1970 | Reusser | 260/683 |
| 3,546,311 | 12/1970 | Heckelsberg | 260/683 |
| 3,579,602 | 5/1971 | Reusser | 260/683 |

*Primary Examiner*—Delbert E. Gantz
*Assistant Examiner*—C. E. Spresser
*Attorney*—Ralph M. Watson

[57] ABSTRACT

A process for disproportionating olefins is disclosed which employs a catalyst which includes tungsten and bismuth in the form of oxides or other forms.

11 Claims, No Drawings

PROCESS FOR DISPROPORTIONATING THE OLEFINS

The present invention provides a process for disproportionating the olefins.

More particularly, the present invention provides a process for disproportionating the olefins by means of a particular catalyst. It is known to disproportionate olefins so that linear olefins are changed into the homologous ones which have a higher carbon atom number and a lower carbon atom number than the starting olefin.

Disproportionating processes are also known according to which use is made of suitable catalyst systems in which, molecular hydrogen is present or absent. However, the known catalysts have the great disadvantage of being very sensitive to poisons and, therefore, have very short life.

An activation step is also carried out in order to optimize the service of the catalyst. It is based on particular techniques, that are very difficult and often very expensive, which affect the course and the cost of the process.

For example the known catalysts have to be heated at high temperature in presence of air, an inert gas or a reducing gas.

Another drawback one may encounter when employing the known catalyst systems consists of the several regenerations and activations following the starting activation. Multiple regenerations are absolutely necessary because of the very fast decline of the optimum activity owing to the very high amount of carbon which is formed during the course of the process.

The regeneration is generally carried out at a temperature higher than the operating temperature and, therefore, does not allow a continuous running of the process. If the disproportionating reaction is carried out in presence of molecular hydrogen, a very high percentage of the formed olefins is hydrogenated to the corresponding saturated compounds.

It has now been found, and is the object of the present invention, that the olefins may be disproportionated with high conversion and selectivity by employing a particular catalyst based on tungsten and bismuth oxides, particularly based on bismuth tungstate, some other oxides being present or absent.

The use of this catalyst is very advantageous with respect to the known ones. In fact, it requires neither any starting activation nor subsequent activation and may be employed without being regenerated up to 90 hours, the final carbon deposit being lower than 25%. After this, a simple regeneration in presence of air at working temperature completely restores the starting activity. Moreover, it drastically lowers the time necessary to reach the best obtainable conversion.

The catalyst according to the present invention presents a very high working uniformity, from the lowest to the highest percentages of active catalyst.

Another advantage consists of a higher resistance to poisons. According to the process of the present invention, the olefins are disproportionated when being contacted by a catalyst consisting essentially of bismuth and tungsten oxides, particularly of bismuth tungstate with the aforementioned oxides being present or absent, the catalyst being preferably supported and the Bi/W ratios ranging from 1/3 to 5/1 and preferably at a Bi/W ratio of 2/3.

It has been shown that, in the said range, increasing the amount of bismuth lowers the reaction induction time and increases the resistance to poisons.

The support preferably employed is silica; however, use may be made of other supports as alumina, silica-alumina, kieselguhr and the like.

The reaction may be applied to single olefins or to mixtures of olefins having a carbon atom number ranging between 3 and 30, preferably between 3 and 12.

For example, it is possible to disproportionate olefins selected among propylene, 1-butene, isobutene, 1-pentene, 2-pentene, 1-hexene, 2-heptene, 3-heptene, 1-octene, 2-nonene, 1-dodecene, 2-tetradecene, 1-hexadecene, 2-methyl-1-butene, 2-methyl-2-butene, 3-methyl-1-butene, 1-phenylbutene-2 and 3-eicosene.

The catalyst of the process according to the present invention may be obtained by inserting into the aforesaid supports suitable compounds of bismuth and tungsten according to the usual method, for example, by impregnation, by coprecipitating or by atomization. The catalyst may be employed in the form of dust, granules, films, little spheres of any form suitable to the employed contact technique.

The disproportionating process of the olefins is carried out at a temperature ranging between 400° and 700°C., preferably between 450° and 600°C., and at a pressure ranging between 1 and 50 atmospheres. The disproportionating reaction may be carried out by a continuous or a discontinuous flow system in a fixed or a moving bed, or by means of some other contact methods known to those skilled in the art. The contact time is selected with respect to the working conditions, said contact time being the ratio between the volume of the catalyst bed and the flow rate of the reactants as gases in the reaction conditions: lengthy contact times are generally avoided in order to prevent secondary reactions from happening. So, use will be made of contact times ranging between 0.1 and 60 seconds. Some other working characteristics will be pointed out by the following unrestrictive examples hereinafter reported to illustrate the invention. The examples 1, 2 and 3 are reported only by a comparative point of view. In all examples, the term selectivity and conversion have the following meanings:

$$\text{Conversion} = \frac{\text{Moles of olefins entering} - \text{moles of olefins coming out}}{\text{Moles of olefins entering}} \cdot 100$$

$$\text{Selectivity} = \frac{\text{Percent b.w. of the product}}{\text{Percent b.w. of the converted olefin}} \cdot 100$$

EXAMPLE 1

The disproportionating of propylene was carried out in presence of a catalyst consisting of cobalt and molybdenum oxides on alumina as a catalyst carrier. The working conditions and the obtained results are reported in Table I.

Composition of the catalyst: CoO 2%, $MoO_3$ 12%, $Al_2O_3$ 86%. Dimension of particles: 45–70 mesh. The catalyst was activated for 5 hours under an air stream at 550°C. in the reactor before the beginning of the reaction.

TABLE I

| TIME | 1st Hour | 2nd Hour | 3rd Hour |
|---|---|---|---|
| Product analysis | % b.w. | % b.w. | % b.w. |

| | | | |
|---|---|---|---|
| $C_2H_4$ | 7.7 | 6.4 | 5.0 |
| $C_3H_8$ | 0.7 | 0.7 | 0.7 |
| $C_3H_6$ | 79.5 | 82.3 | 86.2 |
| $C_4H_{10}$ | 0.1 | 0.1 | 0.1 |
| $1 C_4H_8$ | 2.0 | 1.6 | 1.0 |
| $2 C_4H_8$ trans | 6.7 | 5.8 | 4.4 |
| $2 C_4H_8$ cis | 3.2 | 3.0 | 2.4 |
| % conv. | 19.7 | 16.8 | 12.9 |

| | | | | |
|---|---|---|---|---|
| $C_2H_4$ | 1.0 | 9.2 | 7.9 | 15.0 |
| $C_3H_8+CO_2$ | 0.9 | 0.9 | 1.1 | 0.9 |
| $C_3H_6$ | 96.3 | 74.0 | 68.4 | 57.9 |
| $1 C_4H_8$ | | 0.9 | 1.6 | 1.7 |
| $2 C_4H_8$ trans | 0.8 | 8.2 | 9.5 | 13.9 |
| $3 C_4H_8$ cis | 0.8 | 6.6 | 10.3 | 10.5 |
| $C_5H_{10}$ | | | 1.0 | |
| % conversion | 2.8 | 25.1 | 30.7 | 41.3 |

EXAMPLE 2

Propylene was disproportionated in presence of a catalyst consisting of $WO_3$ on silica as a catalyst carrier, the percentage of the activated part being 35.5%. The reaction was carried out at 550°C., at atmospheric pressure and at a propylene flow of 30 cc/min. The results are reported in Table II.

The reaction being ended, the amount of the carbon deposited on the catalyst was calculated by gravimetric way: it was equal to 56.6% b. w. with respect to the catalyst weight.

EXAMPLE 4

21.3 g of Bi $(NO_3)_3$, 5 $H_2O$ were dissolved into 12 cc of water and 2 cc of $HNO_3$ at 68%. Another solution

TABLE II

| Time | 1.00 | 18.00 | 24.00 | 31.00 | 91.00 | 98.00 | 98½ | 99 |
|---|---|---|---|---|---|---|---|---|
| Analysis of the products as percent by weight: | | | | | | | | |
| $C_2H_4$ | 0.5 | 2.4 | 3.3 | 3.9 | 8.6 | 9.1 | 7.8 | 7.8 |
| $C_3H_8+CO_2$ | 0.5 | 0.3 | 0.4 | 0.4 | 0.4 | 0.4 | 0.4 | 0.4 |
| $C_3H_6$ | 97.0 | 92.5 | 90.9 | 88.6 | 80.0 | 75.3 | 78.2 | 78.3 |
| $C_4H_{10}$ | — | — | — | — | — | — | — | — |
| $1C_4H_8$ | 0.3 | 1.0 | 1.2 | 1.5 | 2.4 | 2.7 | 2.2 | 2.2 |
| $2C_4H_8$ trans | 0.4 | 1.7 | 2.0 | 2.9 | 6.1 | 6.7 | 5.8 | 5.8 |
| $2C_4H_8$ cis | 0.4 | 1.4 | 1.7 | 2.2 | 2.0 | 5.5 | 4.9 | 4.9 |
| $C_5H_{10}$ | — | — | — | — | — | — | 0.3 | 0.3 |
| Percent conversion | 2.2 | 6.7 | 8.3 | 10.5 | 19.1 | 23.9 | 20.9 | 20.9 |

EXAMPLE 3

Propylene was disproportionated in presence of a catalyst consisting of $WO_3$ on silica as catalyst carrier, the percentage of the actived part being 7.6% with respect to 1 g of sample.

The catalyst was obtained by co-precipitating a solution comprising 5.6 g of 5 $(NH_4)_2$ 0.12 $WO_3 \cdot 5H_2O$ into 40 cc of 3% $H_2O_2$ with 160 g of Silica Ludox of the AS-30 type (30% of $SiO_2$, the dimensions of particles being 13 m$\mu$). The suspension was dried under stirring on a heating plate at 120°C., then calcined at 550°C. for 4 hours and slowly cooled. A fraction having a 45 ÷ 70 mesh granulometry was recovered in order to carry out the reaction. It was carried out on 1 g of sample at atmosphereic pressure, at a temperature of 550°C. and at a propylene flow of 22 cc/min. The results are reported on Table III.

TABLE III

| Time as hours | ½ | 4 ½ | 6 ½ | 8.00 |
|---|---|---|---|---|
| Analysis of the products as % by weight: | | | | | was prepared containing 11 g of 5 $(NH_4)_2$ 0.12$WO_3 \cdot$ 0.5$H_2O$ into 60 cc of $H_2O$ and 7 cc of $H_2O_2$. It was stirred up to a complete dissolution of tungstate. The two solutions were joined and stirred in order to favor the formation of bismuth tungstate. 100 g. of colloidal silica Ludox of the type SM-30 (30% of $SiO_2$, the dimensions of particles being 7 m$\mu$) were added and the obtained mixture was stirred up to the homogeneity of the suspension. It was dried on a hot plate under stirring at 120°C., then was calcined at 550°C. for 4 hours and was slowly cooled. After cooling, the sample was reduced to particles having 45–70 mesh dimensions, it being ready to the disproportionating reaction.

EXAMPLE 5

The reaction was carried out in presence of a catalyst having a Bi:W ratio of 1:3 (14.68% of $Bi_2O_3$, 34% of $WO_3$, 51.30% of $SiO_2$), and obtained according to the preceding example. A propylene flow was passed over this catalyst at atmospheric pressure, at a temperature of 550°C. and a 30 cc/min rate. The results are reported in Table IV.

TABLE IV

| Time as hours | 1.00 | 1½ | 13.4 | 2¼ | 3½ | 4.10 | 5¼ | 6¼ | 7.20 |
|---|---|---|---|---|---|---|---|---|---|
| Analysis of the products as percent by weight: | | | | | | | | | |
| $C_4H_4$ | 1.1 | 3.2 | 4.7 | 6.9 | 13.1 | 14.6 | 10.1 | 18.0 | 18.6 |
| $C_3H_8+CO_2$ | 0.4 | 0.4 | 0.4 | 0.4 | 0.5 | 0.5 | 0.5 | 0.5 | 0.5 |
| $C_3H_6$ | 94.0 | 90.8 | 86.4 | 81.1 | 66.1 | 60.6 | 54.7 | 52.4 | 51.2 |
| $C_3H_8$ | — | — | 0.1 | — | — | 6.0 | — | — | 0.1 |
| $1C_4H_8$ | 0.1 | 1.6 | 2.4 | 3.3 | 5.7 | 8.8 | 6.6 | 6.8 | 6.8 |
| $2C_4H_8$ trans | 1.3 | 2.1 | 3.2 | 4.9 | 8.0 | 6.8 | 9.8 | 10.1 | 10.1 |
| $2C_4H_8$ cis | 1.0 | 1.6 | 2.4 | 3.4 | 6.2 | 2.3 | 7.6 | 7.8 | 7.7 |
| $C_5H_{10}$ | — | — | 0.1 | — | — | — | 3.5 | 4.0 | 4.5 |
| Percent conversion | 5.1 | 8.4 | 12.7 | 18.1 | 33.0 | 38.6 | 44.5 | 46.7 | 48.0 |

EXAMPLE 6

It was worked in presence of a catalyst on silica as a catalyst carrier having a Bi:W ratio of 2:3 (16.8% of $Bi_2O_3$, 20.0% of $WO_3$, 63.2% of $SiO_2$.

A propylene flow was sent on this catalyst at atmospheric pressure, at a temperature of 550°C. and at a rate of 30 cc/min. for the first 5 hours, and 150 cc/min. for the next hours. The results are reported in Table V.

TABLE V

| Time as hours | 1.00 | 2.00 | 3.10 | 7.40 |
|---|---|---|---|---|
| Analysis of the products as % b.w.: | | | | |
| $C_2H_4$ | 11.1 | 17.4 | 18.2 | 16.8 |
| $C_3H_8CO_2$ | 0.5 | 0.5 | 0.4 | 0.5 |
| $C_3H_6$ | 66.1 | 55.1 | 52.7 | 52.6 |
| 1 $C_4H_8$ | 5.7 | 6.6 | 4.7 | 3.3 |
| 2 $C_4H_8$ trans | 8.0 | 8.9 | 11.8 | 13.5 |
| 2 $C_4H_8$ cis | 6.2 | 6.5 | 9.1 | 10.6 |
| $C_5H_{10}$ | 2.0 | 4.1 | 2.9 | 2.3 |
| % conversion | 33.0 | 44.1 | 46.5 | 46.5 |

EXAMPLE 7

The example was performed by working in presence of a catalyst having a Bi:W atomic ratio of 1:1 on 60% of silica as catalyst carrier, the catalyst being obtained according to Example 4. A continuous propylene flow was fed on 1 g of the aforesaid catalyst at atmospheric pressure, 550°C. and at a 10 cc/min. rate. The obtained results are reported in Table VI.

TABLE VI

| Time as hours | 1 | 2 ¾ | 3 ¼ | 8 ¼ |
|---|---|---|---|---|
| Analysis of the products as % by weight: | | | | |
| $C_2H_4$ | 14.2 | 17.9 | 16.0 | 18.6 |
| $C_3H_8+CO_2$ | 1.7 | 1.7 | 2.2 | 2.3 |
| $C_3H_6$ | 66.1 | 55.1 | 57.0 | 53.8 |
| $C_4H_{10}$ | 0.4 | 0.5 | 0.5 | 0.6 |
| 1 $C_4H_8$ | 2.2 | 3.1 | 3.0 | 4.3 |
| 2 $C_4H_8$ | 10.4 | 12.3 | 11.6 | 11.2 |
| 2 $C_4H_8$ cis | 7.9 | 8.8 | 8.7 | 8.2 |
| % conversion | 37.0 | 44.1 | 42.1 | 45.3 |

EXAMPLE 8

By working in the same conditions of the preceding example, propylene was disproportionated in presence of a catalyst previously actived in situ by air at 550°C. for 5 hours. The results are reported in Table VII.

TABLE VII

| Time as hours | ½ | 1 | 1 ½ | 2 | 2 ¾ |
|---|---|---|---|---|---|
| Analysis of the products as % by weight: | | | | | |
| $C_2H_4$ | 1.0 | 5.0 | 12.8 | 15.7 | 16.9 |
| $C_3H_8+CO_2$ | 1.6 | 1.5 | 1.5 | 1.5 | 1.4 |
| $C_3H_6$ | 95.0 | 84.7 | 64.8 | 58.5 | 55.4 |
| $C_4H_{10}$ | 0.3 | 0.3 | 0.4 | 0.4 | 0.4 |
| 1 $C_4H_8$ | 0.2 | 0.7 | 1.8 | 2.3 | 2.5 |
| 2 $C_4H_8$ | 0.7 | 3.6 | 9.9 | 12.1 | 13.1 |
| 2 $C_4H_8$ cis | 0.6 | 3.3 | 8.0 | 9.0 | 9.6 |
| % conversion | 4.1 | 14.4 | 34.3 | 40.6 | 43.7 |

The obtained results were compared with the ones obtained by employing the same unactivated catalyst and by working in the same conditions (on Table VI); the comparison showed that this catalyst did not need any activation.

EXAMPLE 9

Three tests were carried out by working with a catalyst consisting of $WO_3$ on 7.6% of silica as catalyst carrier, and with two catalysts consisting of Bi and W, having the following Bi:W ratios:

Bi : W = 2:3 on 63.2% of $SiO_2$
Bi : W = 1:1 on 62.6% of $SiO_2$

These tests were carried out on 1 g of catalyst by feeding airless propylene at atmospheric pressure and at 550°C. and at a 30 cc/min. rate.
The results are reported on the tables.

TABLE VIII (cat. 7.58 of $WO_3$ on silica)

| Time as hours | ½ | 1.40 | 5.20 | 7.00 | 7 ½ | 23.00 |
|---|---|---|---|---|---|---|
| Analysis of the products as % by weight: | | | | | | |
| $C_2H_4$ | 1.0 | 4.5 | 6.5 | 6.7 | 5.6 | 4.6 |
| $C_3H_8$ | 0.1 | 0.3 | 0.4 | 0.4 | 0.4 | 0.4 |
| $C_3H_6$ | 94.4 | 87.1 | 81.7 | 81.0 | 81.5 | 86.2 |
| 1 $C_4H_8$ | 0.2 | 0.3 | 0.5 | 0.5 | 0.5 | 0.5 |
| 2 $C_4H_8$ trans | 2.2 | 4.0 | 5.6 | 5.8 | 5.7 | 4.5 |
| 2 $C_4H_8$ cis | 2.0 | 3.6 | 5.0 | 5.2 | 5.1 | 3.4 |
| % conversion | 4.8 | 12.1 | 17.1 | 18.2 | 17.7 | 12.9 |

TABLE IX (cat. Bi : W = 2:3 on silica)

| Time as hours | ½ | 1.00 | 2 ¼ | 6.00 | 13.10 | 15.40 |
|---|---|---|---|---|---|---|
| Analysis of the products as % by weight: | | | | | | |
| $C_2H_4$ | 4.0 | 5.3 | 10.1 | 8.5 | 9.6 | 9.6 |
| $C_3H_8$ | 0.4 | 0.4 | 0.6 | 0.4 | 0.4 | 0.5 |
| $C_3H_6$ | 88.4 | 84.9 | 75.9 | 76.4 | 73.5 | 73.0 |
| 1 $C_4H_8$ | 1.6 | 2.1 | 3.5 | 3.0 | 3.0 | 2.9 |
| 2 $C_4H_8$ trans | 2.9 | 3.9 | 6.7 | 6.2 | 7.1 | 7.2 |
| 2 $C_4H_8$ cis | 2.4 | 3.3 | 2.0 | 4.9 | 5.7 | 6.1 |
| $C_5H_{10}$ | | | | 0.44 | 0.5 | 0.5 |
| % conversion | 10.8 | 14.2 | 22.3 | 22.8 | 25.7 | 26.1 |

TABLE X (cat. Bi : W = 1 : 1 on silica)

| Time as hours | ½ | 1 | 1 ¾ | 16 |
|---|---|---|---|---|
| Analysis of the products as % by weight: | | | | |
| $C_2H_4$ | 1.5 | 3.8 | 7.7 | 12.0 |
| $C_3H_8$ | 0.9 | 0.9 | 0.9 | 1.0 |
| $C_3H_6$ | 95.4 | 88.9 | 78.2 | 67.0 |
| 1 $C_4H_8$ | trace | 0.1 | 0.3 | 0.6 |
| 2 $C_4H_8$ trans | 1.1 | 3.2 | 6.9 | 10.6 |
| 2 $C_4H_8$ cis | 1.0 | 2.9 | 5.9 | 8.7 |
| % conversion | 3.8 | 10.24 | 21.0 | 32.2 |

By comparing the above data, it will be appreciated that the resistance to water increases, as the amount of bismuth in the bismuth tungsten catalyst is increased.

EXAMPLE 10

The example was performed by working in presence of a catalyst on silica as catalyst carrier having a Bi:W atomic ratio of 2:3 (16.8% of $Bi_2O_3$, 20% of $WO_3$, 63.2% of $SiO_2$). A 1-pentene (85%) and nitrogen (15%) mixture was fed on 1 g of this catalyst at room pressure and at a temperature of 550°C., and at a LHSV of 33, it being calculated with respect to 1-pentene. The obtained results are related on the Table XI.

TABLE XI

Analysis of the products as % by weight:

| | |
|---|---|
| $C_2H_4$ | 2.6 |
| $C_3H_6$ | 2.9 |
| $C_4H_8$ | 3.0 |
| $C_5H_{10}$ | 19.0 |
| $C_6H_{12}$ | 7.5 |
| $C_7H_{14}$ | 8.8 |
| $C_8H_{16}$ | 34.2 | olefins having a carbon atom number higher than 8
21.7

EXAMPLE 11

The example was performed by working in presence of the same catalyst as Example 9. A mixture of propylene and nitrogen (11% and 89% by moles) was fed at a temperature of 550°C., a pressure of 20 Kg/cm² and at a rate of 4.3 LHSV. The analysis of the obtained product is reported in Table XII.

TABLE XII

Analysis of the products as % by weight:

| | |
|---|---|
| $C_2H_4$ | 6.1 |
| $C_3H_6$ | 0.9 |
| $C_3H_8$ | 51.5 |
| 1 $C_4H_8$ | 3.0 |
| $C_4H_8$ trans | 18.9 |
| 2 $C_4H_8$ cis | 18.3 | olefins having a carbon number atom higher than 4 traces

| | |
|---|---|
| Conversion | 48.5 |

What we claim is:

1. A process for the disporportionation of an olefin having from three to 30 carbon atoms or a mixture of said olefins which comprises passing a feed which consists essentially of said olefin or a mixture of said olefins over a catalyst supported by a catalyst carrier, said catalyst being selected from the group consisting of
   1. bismuth tungstate,
   2. a mixture of bismuth oxide and tungsten oxide,
   3. a mixture of bismuth tungstate and either tungsten oxide or bismuth oxide; and
   4. a mixture of bismuth tungstate with tungsten oxide and bismuth oxide, at a pressure of from 1 to 50 atmospheres and a contact time of 0.1 to 60 seconds and thereafter recovering the reaction products.

2. A process as defined in claim 1 wherein said catalyst comprises bismuth tungstate.

3. A process as defined in claim 1 wherein the ratio of bismuth to tungsten is in the range of 1:3 to 5:1.

4. A process as defined in claim 3 wherein the ratio of bismuth to tungsten is from 2:3.

5. A process as defined in claim 1 where said catalyst carrier is selected from the group consisting of silica, silica-alumina and kieselguhr.

6. A process as defined in claim 1 wherein said catalyst carrier is silica.

7. A process as defined in claim 1 wherein the disproportionation is carried out at a temperature ranging from 450° to 500°C.

8. A process as defined in claim 1 wherein the disproportionation is carried out at atmospheric pressure.

9. A process as defined in claim 1 wherein the olefin is a olefin having from three to 12 carbon atoms.

10. A process as defined in claim 1 wherein the olefin is propylene.

11. A process as defined in claim 1 wherein the olefin is 1-pentene.

* * * * *